United States Patent [19]
Chapman

[11] Patent Number: 5,127,057
[45] Date of Patent: Jun. 30, 1992

[54] INTEGRAL SOUND SYSTEM HAVING INTERCHANGEABLE MODULES WITH SEPARATE MICROCONTROLLERS

[75] Inventor: Max C. Chapman, Plymouth, Mich.

[73] Assignee: Ford Motor Company, Dearborn, Mich.

[21] Appl. No.: 288,606

[22] Filed: Dec. 22, 1988

[51] Int. Cl.5 ............................................. G06F 15/20
[52] U.S. Cl. ..................................... 381/86; 364/480; 364/925
[58] Field of Search ............... 361/422; 455/348, 345; 381/86; 364/200 MS File, 900 MS File, 480; 369/10

[56] References Cited

U.S. PATENT DOCUMENTS

| 4,183,089 | 1/1980 | Daughton et al. | 364/900 |
| 4,190,350 | 2/1980 | Donohue et al. | 355/14 R |
| 4,292,467 | 9/1981 | Odlen et al. | 455/233 |
| 4,323,787 | 4/1982 | Sato et al. | 307/38 |
| 4,369,478 | 1/1983 | Sato et al. | 360/137 |
| 4,380,809 | 4/1983 | Sato et al. | 369/6 |
| 4,388,712 | 6/1983 | Timm | 369/10 |
| 4,503,513 | 3/1985 | Pogue, Jr. | 364/900 |
| 4,562,535 | 12/1985 | Vincent | 364/200 |
| 4,621,373 | 11/1986 | Hodsdon | 455/347 |
| 4,637,022 | 1/1987 | Burke et al. | 371/37 |
| 4,658,439 | 4/1987 | Danielsen | 455/301 |
| 4,731,769 | 3/1988 | Schafer | 455/345 |
| 4,787,040 | 11/1988 | Ames et al. | 364/424.01 |
| 4,887,311 | 12/1989 | Garner et al. | 455/76 |
| 4,896,370 | 1/1990 | Kasparian et al. | 455/347 |
| 4,965,825 | 10/1990 | Harvey et al. | 364/521 |

FOREIGN PATENT DOCUMENTS 197805 9/1976 France .

OTHER PUBLICATIONS

"Stereo Car Radio Receiver With Built-In Cassette", W. Rietbergeb and J. Henst, *Funkschau*, vol. 48, No. 18, pp. 744-747, Aug. 1976, abstract only.
Blaupunkt Ad, "Dallas SCM 88" Component System, Cassette Player, Sep. 7, 1988.

*Primary Examiner*—Lawrence E. Anderson
*Attorney, Agent, or Firm*—Mark Mollon; Roger L. May

[57] ABSTRACT

An automotive sound system achieves manufacturing flexibility by joining a common chassis which implements radio functions with additional boards that are specific to either a cassette, CD, or DAT mechanism which is to be joined with the radio as an integral unit. Each board is controlled by a microcontroller and the separate microcontrollers are connected by a shared bus.

7 Claims, 3 Drawing Sheets

INTEGRAL SOUND SYSTEM HAVING INTERCHANGEABLE MODULES WITH SEPARATE MICROCONTROLLERS

BACKGROUND OF THE INVENTION

The present invention relates in general to automotive sound systems and, more specifically, to a distributed multiprocessor-based architecture for improving manufacturability of such sound systems.

With the recent introduction of digital audio technology, automobile consumers have been given a selection of automotive sound systems. Thus, a typical system comprises an AM/FM radio receiver combined with a standard cassette tape Player, a digital compact disc (CD) player, or a digital audio tape (DAT) player.

Prior art systems have been designed and manufactured separately according to whether the system is a radio receiver/cassette, a radio receiver/CD, or a radio receiver/DAT. With the advent of electronic radio tuning, digital displays, station search functions, etc., designers have come to rely heavily on the microcontroller. Thus, a microcontroller has been given control of radio functions and tape or CD functions in sound systems designed as integral units.

For example, U.S. Pat. No. 4,292,467, granted to Odlen et al., discloses an audio receiver in which level setting switches are monitored by a microprocessor. Level changes are loaded into memory, displayed to a user, and implemented by the microprocessor.

Component sound systems are also known wherein system parts, such as a radio, an amplifier, and a cassette tape player, are constructed as separate integral components which are interconnected during installation into an automobile. The separate components may each be microprocessor controlled.

The foregoing prior art systems have disadvantages in both design and manufacture. The integral units suffer from high cost due to the need for separate design efforts and different manufacturing operations. Thus, the manufacture of integral units has not been able to achieve full economy of scale. Component systems suffer these same disadvantages in addition to the disadvantage that they require larger dedicated packaging space in the automobile than integral units.

Burke et al., U.S. Pat. No. 4,637,022, discloses a mobile transmit/receive radio having a distributed processing environment. A shared bus links processors internally and externally. A structured subsystem interface is provided such that processors may be added to the system without changing the main control processor. Each processor is modelled as a set of registers which can transmit data to and receive data from the control processor. Therefore, each local processor requires nonshared connections to its peripheral devices. Such a system is undesirable from a manufacturing standpoint due to increased parts count, increased complexity, and reduced reliability. Furthermore, the register approach in Burke et al. is not readily adaptable to existing microprocessor controlled audio sound systems because the addressing and commanding of the multiprocessors requires the development of a new instruction set resulting in added design costs.

SUMMARY OF THE INVENTION

Accordingly, it is a principal object of the present invention to provide an automotive sound system and method of manufacture which reduces the costs of design and implementation.

It is a further object of the invention to achieve flexible and simultaneous manufacture of integral radio receiver and cassette, CD, or DAT sound systems from a common chassis.

It is another object of the invention to provide a plural microcontroller architecture for partitioning each system design into a plurality of interchangeable modules.

These and other objects are achieved in a method for manufacturing an automotive sound system in which a main board is assembled including a main microprocessor means for performing functions common to a plurality of selected sound systems A control board is assembled including a sound source mechanism corresponding to at least one of the selected sound systems and including mechanism microprocessor means for controlling the sound source mechanism. The main board and the control board are joined and their microprocessor means are connected to a common bus. Preferably, the method further includes the step of assembling a bezel board including operator means for receiving operator input and displaying output information and including bezel microprocessor means for processing the operator input and the output information. The bezel board is joined to the main and control boards and the bezel microprocessor means is connected to the common bus.

The invention thus achieves reduced costs and increased flexibility in manufacture of automotive sound systems through functional and structural partitioning of the system into bezel, mechanism, and main chassis modules. The system functions are partitioned in a manner which minimizes the number of interconnections needed between the modules. The final manufacture of a complete system is accomplished by selecting the appropriate bezel and mechanism modules corresponding to the type of system (e.g., cassette, CD, or DAT) and joining them to a main chassis module which is preferably common to all system types.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
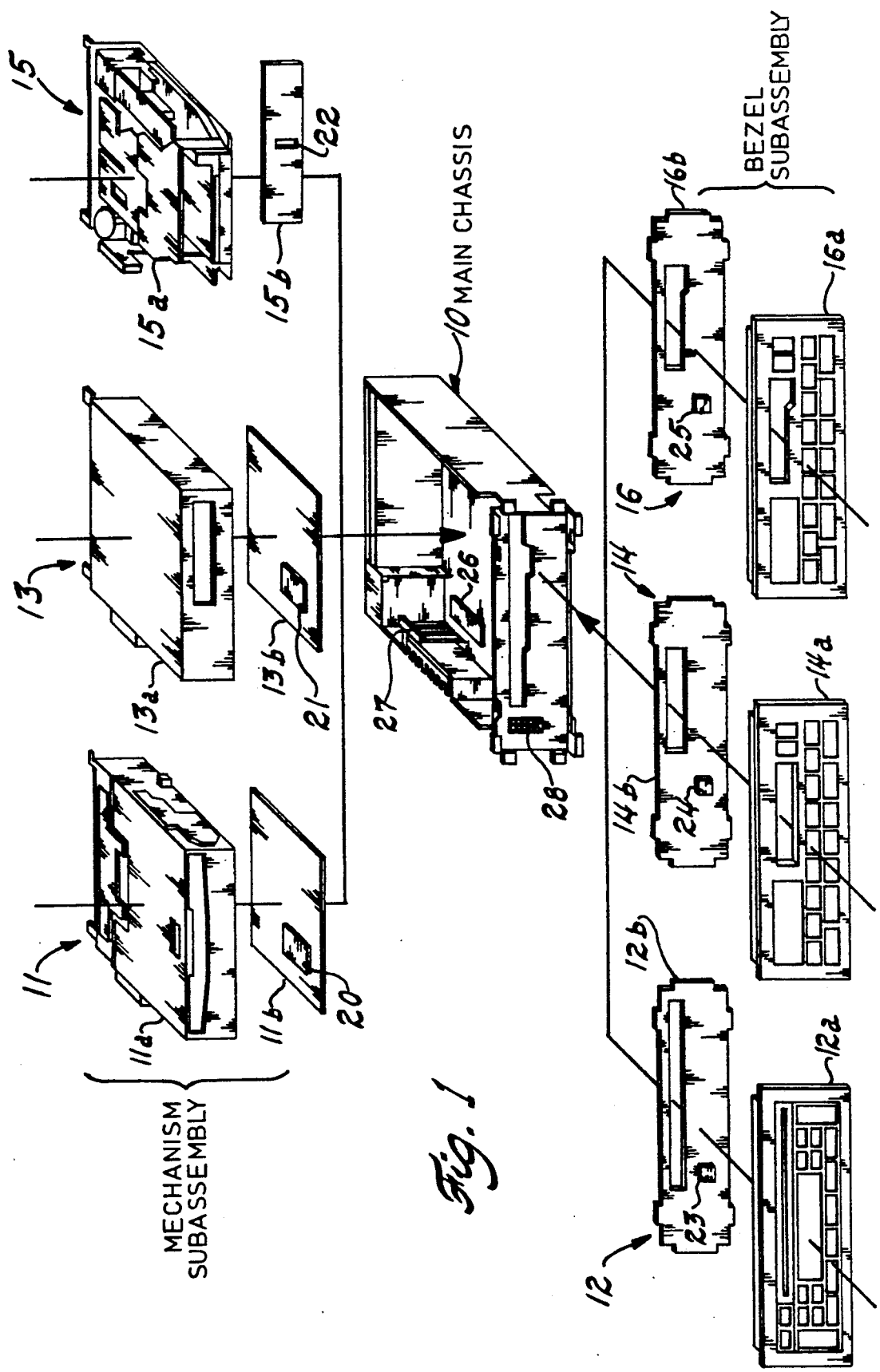
FIG. 1 is a perspective view of each of the boards and their variants which can be assembled to create different sound systems according to the invention.

Referring to FIG. 1, a main chassis 10 provides primary radio functions common to several different sound systems and provides a structure to which a mechanism subassembly and a bezel subassembly are attached to form an integral unit. Thus, an integral CD-radio unit can be obtained by joining CD mechanism subassembly 11 and CD bezel subassembly 12 with main chassis 10. Similarly, a DAT-radio is obtained by joining DAT mechanism subassembly 13 and DAT bezel assembly 14 with main chassis 10, while a cassette-radio is obtained by joining Cassette mechanism subassembly 15 and cassette bezel subassembly 16 with main chassis 10.

Each mechanism subassembly includes a respective mechanism 11a, 13a, and 15a for retrieving recorded signals from a particular recorded medium, e.g., CD's, DAT's, and cassettes. Such mechanisms are well known in the art. Each mechanism subassembly further comprises an attached mechanism control board 11b, 13b, or 15b containing the circuitry necessary to operate the mechanism, including a respective microprocessor 20, 21, and 22 and associated memories, input/output devices, and peripherals (not shown) forming respective microcontroller chip sets.

Each bezel subassembly includes a respective bezel front plate 12a, 14a, and 16a, respectively, and an attached bezel board 12b, 14b, and 16b, respectively. The bezel boards include a respective microprocessor 23, 24, and 25, and associated chips (not shown). The bezel subassemblies function to provide operator interface functions such as system inputs (e.g., volume, tuning, search control) and output displays (e.g., received frequency, track number, tape direction).

Main chassis 10 has its own main board including a main microprocessor 26 and associated microcontroller chips and other devices (not shown) to implement the radio and main audio functions of the integral sound system. Further included on the main chassis are a mechanism connector 27 and a bezel connector 28 for interconnecting the respective microcontrollers when the subassemblies are joined to the main chassis. Preferably, the connectors 27 and 28 comprise connections forming a common bus used by all three microcontrollers with one of the microcontrollers governing usage of the bus via interrupts.

Figure 2:
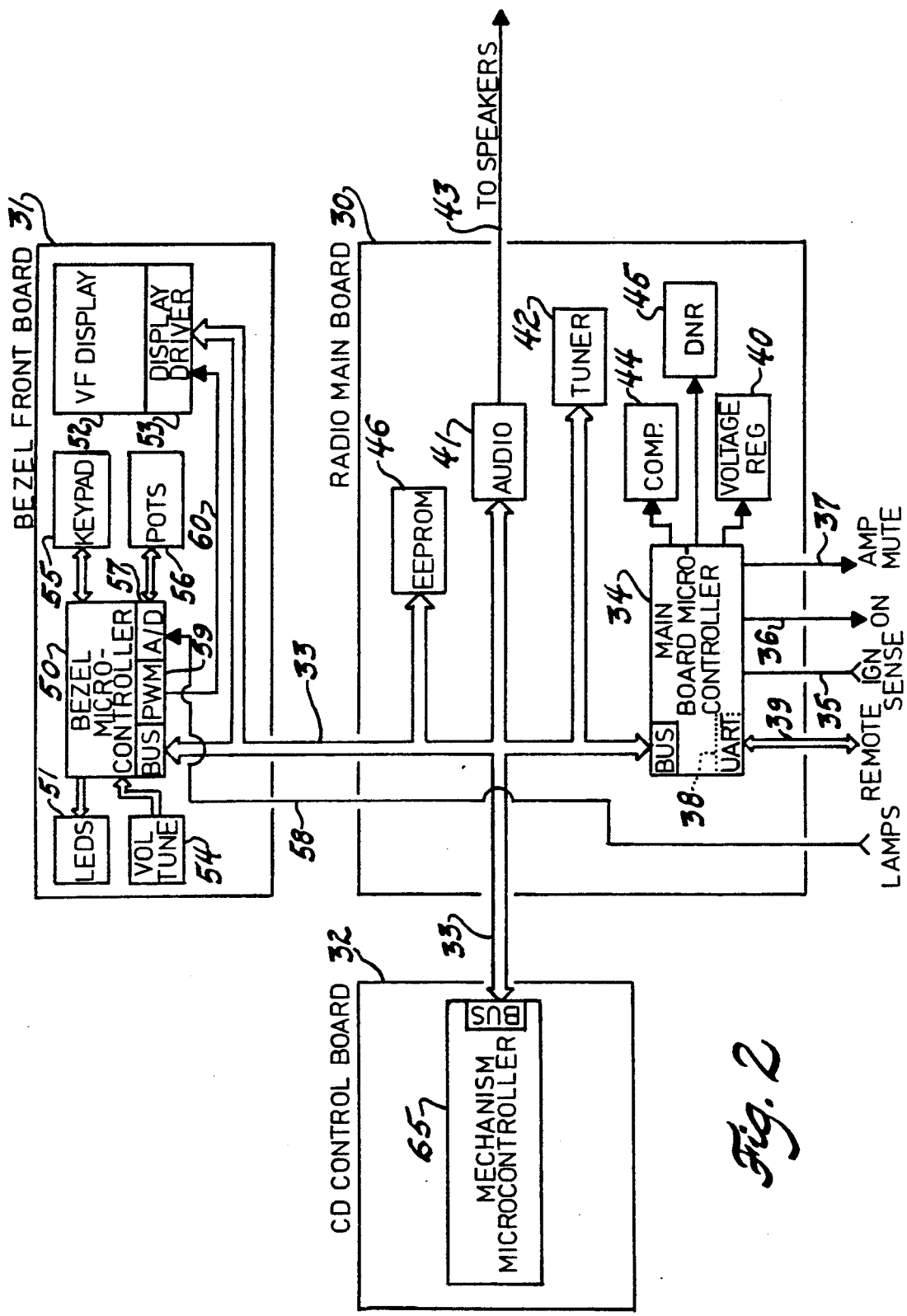
FIG. 2 is a functional block diagram of the distributed multiprocessor architecture of the invention.

Turning now to FIG. 2, the distributed control architecture of the preferred embodiment will be described in more detail. Main board 30, bezel board 31, and mechanism board 32 are interconnected by a common bus 33. The functional partitioning of the audio system of FIG. 2 is determined such that minimum interconnections and communications are needed between different boards and such that each board can be tested as a stand-alone unit via its bus. Thus, each board preferably includes a complete microcontroller including a microprocessor, memory (RAM and ROM), and input-/output devices.

Main board 30 performs the functions which are common to a family of sound systems, i.e., which are independent of whether the system is a Cassette, CD, or DAT. Main board microcontroller 34 keeps a software time-of-day clock (which can be displayed on bezel board 31 as is explained later). Main microcontroller 34 senses the on/off state of the ignition/accessory switch of the automobile such that the sound system can be activated only with the ignition/accessory switch on. Main power to the sound system peripheral devices (e.g., a power antenna) is controlled via a line 36 connected to main microcontroller 34. The output of an external audio power amplifier can be muted by main microcontroller 34 by generating a signal on line 37. Microcontroller 34 includes a universal asynchronous receiver-transmitter (UART) 38 and a communication line 39 which provide an RS-232 port to allow remote control and/or testing of main board functions. Although not shown, bezel board 31 and mechanism board 32 may also include such a port.

Main board 30 includes an audio processing section 41 coupled to bus 33 and controlled by main microcontroller 34. Audio section 41 receives playback sound signals from the mechanism board 32 via a connection not shown or receives radio program signals from a tuner 42 also coupled to bus 33 and controlled by main microcontroller 34. Audio section 41 controls system volume, balance, fade, bass level, treble level, and mute. The final audio output is provided from an internal power amplifier to speakers via a line 43 or, alternatively, as low level audio signals to an external power amplifier.

Main board 30 may also include a compression section 44 and a DNR noise reduction section 45 each connected to and controlled by main microcontroller 34 to improve the sound quality of audio signals processed in audio section 41. A read/write anti-theft EEPROM (electrically erasable programmable read-only memory) 46 is included on main board 30 coupled to bus 46 such that operation of the sound system may be conditioned on an exact match between a user entered security code and the contents of EEPROM 46 in the event that car battery power has been disconnected from the audio system.

Main microcontroller 34 preferably includes a nonvolatile memory for storing control parameters used by main board 30 such as volume level, tuner frequency, etc. Nonvolatile memory stores these Parameters after the system power is turned off so that when the unit is turned back on, the Previous settings can be restored.

Considering now bezel board 31, a bezel microcontroller 50 is coupled to bus 33. Bezel board 31 performs all the system functions related to operator interface such as display of parameters and reading of operator actuated controls. One or more light-emitting diodes (LED's) 51 are connected to bezel microcontroller 50 to indicate system status such as power on. A visual display 52 and display driver 53 are coupled to bus 33 and controlled by bezel microcontroller 50 to display information such as time of day, tuner frequency, or track number. Display 52 can comprise a vacuum fluorescent (VFD) or a liquid crystal (LCD) display, for example.

Operator input devices connected to bezel microcontroller 50 include volume/tuning up-down switches 54 and an input key pad 55. Input potentiometers 56 are coupled to bezel microcontroller 50 via an analog-to-digital converter (A/D) 57. Keypad 55 can include cassette, CD, or DAT functions, preset radio frequencies, etc., and potentiometers 56 can represent audio balance, treble and bass levels, and fade, for example.

Dimming of visual display 52 is achieved by obtaining a light signal from an ambient light sensor or from automobile running light switches on a "lamps" line 58 which is coupled to A/D converter 57. Bezel microcontroller 50 determines an appropriate brightness for display 52 and commands that brightness to display driver 53 via a pulse width modulator (PWM) 59 and a line 60.

Mechanism board 32 includes a mechanism microcontroller 65 coupled to bus 33. Other components on mechanism board 32 depend on the nature of the particular sound system, but can include motor controls for turning tape capstans and spindles or a disk drive, tape head or laser pick-up controls, and a digital-to-analog (D/A) converter. Mechanism microcontroller 65 controls such functions as loading and ejecting, play, pause, stop, fast forward, rewind, and automatic music search in a manner known to those skilled in the art.

Interaction of the three separate boards depends on an orderly use of bus 33. Thus, bezel microcontroller 50 supervises all access to bus 33. In order to provide a generic interface between boards and to allow flexibility in changing one board without impacting the design of another board, substantially all communications between boards is directed between microcontrollers. Thus, although bezel microcontroller 50 could communicate an increased volume setting directly to audio section 41, the new setting is instead communicated to main microcontroller 34 which then commands the new volume level.

The bus structure and communication protocol of the invention will be described in connection with FIG. 3, which shows integrated circuits corresponding to FIG. 2, bus data lines and bus control lines. Bezel microcontroller 50 is a system master and may be comprised of an 888CG microcontroller manufactured by National Semiconductor. Main microcontroller 30 is a slave of bezel microcontroller 50 and may also be comprised of an 888CG. Main microcontroller 30 is master to audio processor 41, frequency synthesizer or tuner 42, and EEPROM 46. Mechanism microcontroller 65 is a slave to bezel microcontroller 50 and may be comprised of a CXP5058 microcontroller manufactured by Sony Corporation.

The microcontrollers are interconnected by a serial bus 33 which comprises a master output line 70, a master input line 71, and a serial clock line 72. Clock line 72 provides a timing reference for serial transfers of data on lines 70 and 71. Line 70 connects the serial data output of bezel microcontroller 50 to the serial data inputs of main microcontroller 30, mechanism microcontroller 65, and display driver 53. Line 70 further connects the serial data input of bezel microcontroller 50 to the serial data outputs of main microcontroller 30 and mechanism microcontroller 65. Line 71 further connects the serial data output of main microcontroller 30 to the serial data inputs of audio processor 41, frequency synthesizer 42, and EEPROM 46.

Figure 3:
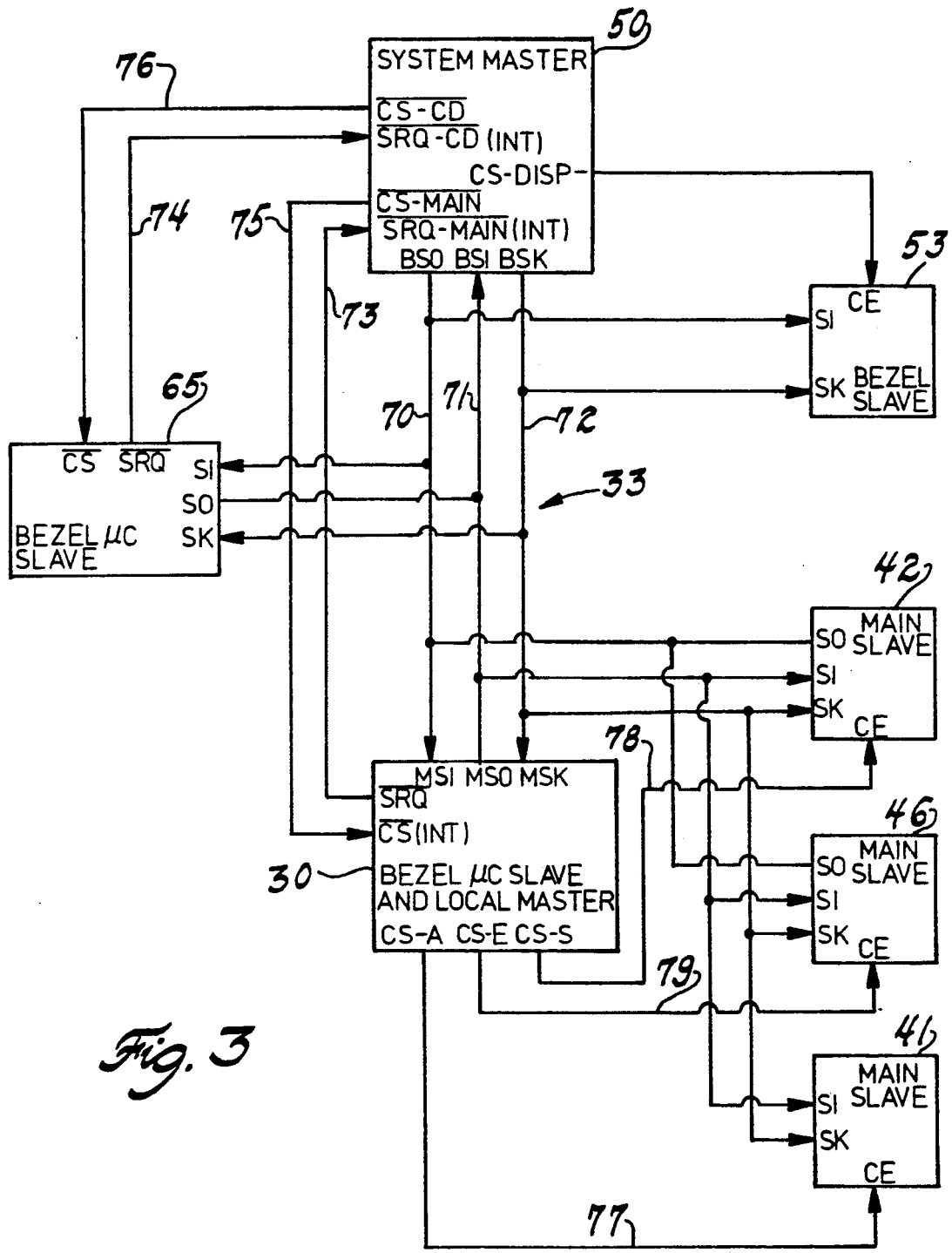
FIG. 3 is a schematic diagram of a preferred implementation of a portion of the architecture of FIG. 2.

FIG. 3 also shows bus control lines 73, 74, 75, and 76 for coordinating the transmission of commands, messages, and data between bezel microcontroller 50 and its slave microcontrollers 30 and 65, according to an established, orderly protocol. As system master, bezel microcontroller 50 initiates command transmissions to main microcontroller 30 or mechanism microcontroller 65 by first annunciating an upcoming command using either chip select line 75 or 76, respectively. Conversely, messages or data are transmitted by slave microcontrollers 30 and 65 to bezel master microcontroller 50 by annunciating a transfer (and interrupting bezel microcontroller 50) via service request lines 73 and 74. After an acknowledgement from the microcontroller to receive the transmission, the transmission is accomplished over serial bus 33.

Exclusive access periods to bus 33 are required by main microcontroller 30 and are obtained by appropriate commands and messages. Whenever main microcontroller 30 requires use of common bus 33 to communicate with its slave devices 41, 42, and 46, it must request bus control by transmitting a "bus mastership request" message to bezel microcontroller 50. After granting bus mastership to main microcontroller 30 via a "bus mastership granted" command, bezel microcontroller 50 delays servicing interrupts from mechanism microcontroller 65 or display 53 until main microcontroller 30 relinquishes possession of the bus, as indicated by the receipt of a "finished with bus" message from main microcontroller 30. During the time that exclusive bus access is granted, main microcontroller 30 can communicate with its slaves by signalling a particular slave over a chip select line 77, 78, or 79.

The foregoing describes an automotive sound system capable of flexible, cost reduced manufacture due to the partitioning of system functions into modules. The use of a common chassis for all systems reduces design cost. By providing a generic interface protocol between modules, improvements can be made to individual modules without any impact on other modules.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An integral audio unit comprising:
    a main board for performing audio functions common to players for playback of prerecorded media, said players being from the group comprising a cassette player, a compact disc player, and a digital audio tape player, said main board adapted to receive interchangeable pairs of a mechanism subassembly and a bezel subassembly, each pair corresponding to a respective one of said players;
    a main chassis receiving said main board;
    said mechanism subassembly including a mechanism microprocessor controlling a player selected from said group of players, said mechanism subassembly being secured to said main chassis and said mechanism microprocessor connected to communicate with said main board; and
    said bezel subassembly including a bezel microprocessor responsive to operator inputs and controlling a display for said selected player, said bezel subassembly being secured to said main chassis and said bezel microprocessor connected to communicate with said main board.

2. The unit of claim 1 wherein said main board includes a main microprocessor for controlling said common audio functions, said unit further comprising:
    a serial bus interconnecting said main microprocessor, said mechanism microprocessor, and said bezel microprocessor, access for transmitting messages on said serial bus being controlled by said bezel microprocessor.

3. An automotive sound system assembly comprising:
    a main board including main microprocessor means for controlling acoustic characteristics of an audio output signal from said sound system, said main board adapted to receive audio signals from any one of a plurality of types of recorded media;
    a source mechanism board including a sound source mechanism for a selected one of said types of recorded media providing an audio input signal to said main board, said source mechanism board further including mechanism microprocessor means for controlling said mechanism;
    a bezel board adapted to said selected type of recorded media and including operator means for receiving operator input and displaying operator output and including bezel microprocessor means for processing said operator input and said operator output;
common bus means for connecting said main microprocessor means, said bezel microprocessor means, and said mechanism microprocessor means; and
a chassis for receiving said main board, said source mechanism board, said bezel board, and said common bus means, whereby said system comprises an integral sound system for playing recorded media of said selected type.

4. The system of claim 3 wherein said common bus means includes bus serial communication lines interconnecting said main microprocessor means, said mechanism microprocessor means, and said bezel microprocessor means and wherein said common bus means includes bus control lines connecting said bezel microprocessor means to said main microprocessor means and said mechanism microprocessor means, whereby access to said bus communication lines is controlled by said bezel microprocessor means.

5. The system of claim 3 wherein said sound source mechanism is comprised of a cassette tape player.

6. The system of claim 3 wherein said sound source mechanism is comprised of a compact disc player.

7. The system of claim 3 wherein said sound source mechanism is comprised of a digital audio tape player.

* * * * *